Patented Oct. 15, 1946

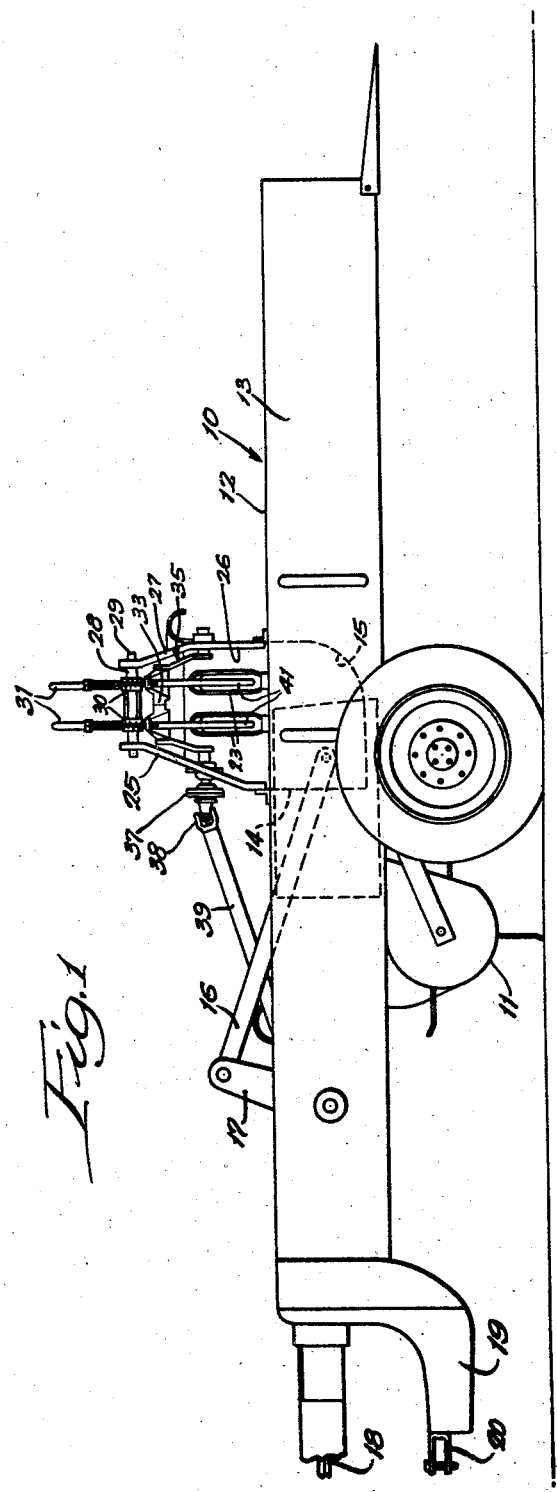

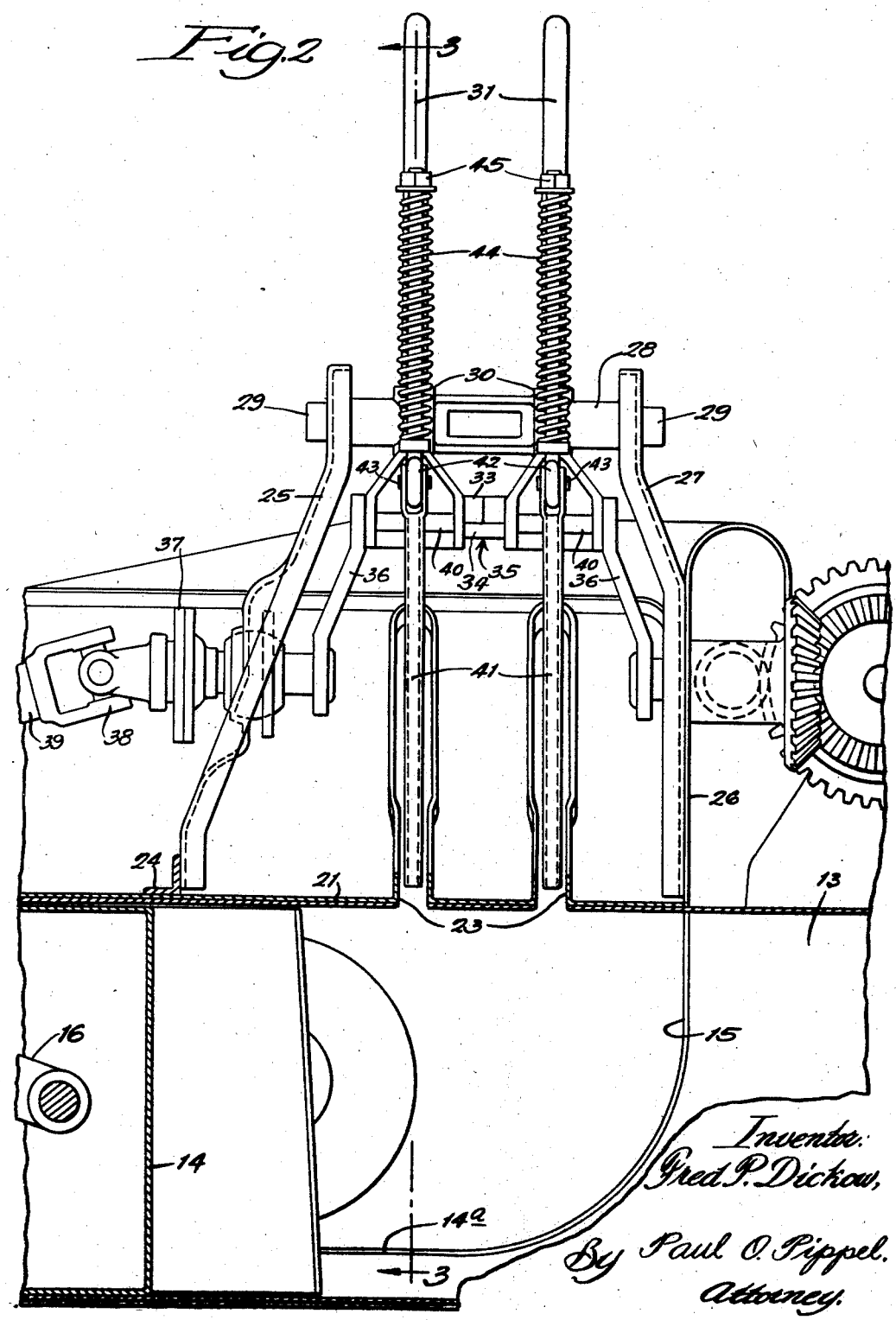

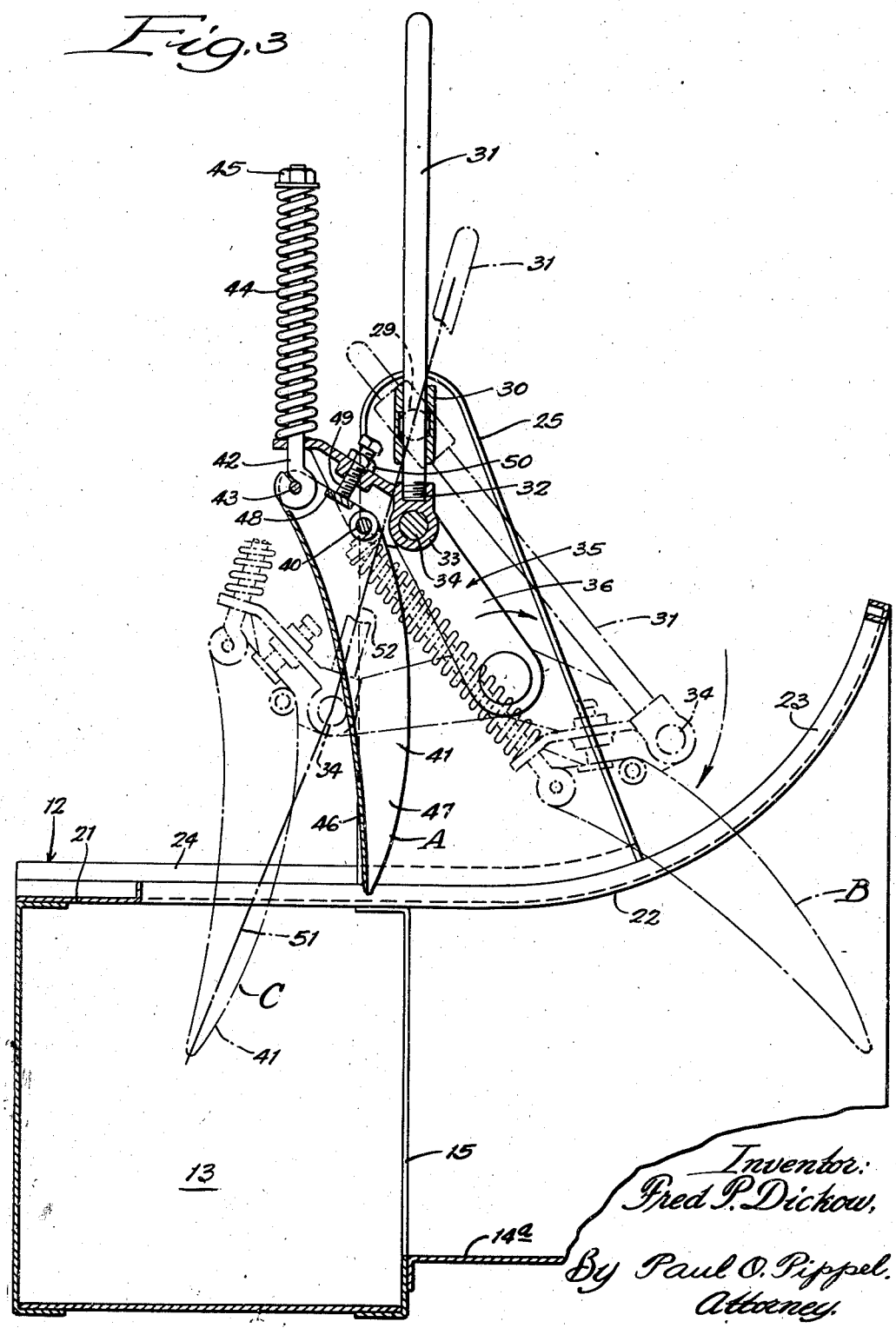

2,409,478

UNITED STATES PATENT OFFICE 2,409,478

FEEDER FOR BALERS

Frederick P. Dickow, Chicago, Ill., assignor to International Harvester Company, a corporation of New Jersey Application November 17, 1943, Serial No. 510,579

5 Claims. (Cl. 100—25)

This invention relates to an improved feeding device used with a baler. More specifically, it relates to a control for a feeder used with a pick-up baler having a feed opening in the vertical side of the baling chamber.

In the copending application of Crumb et al., Serial No. 466,460, filed November 21, 1942, there is illustrated and claimed in some detail a pick-up baler having a feed opening in a vertical side of the baling chamber. The location of the feed opening in the vertical side of the baling chamber has many advantages in a pick-up baler, but the movement of material through the feed opening into the baling chamber presents many problems. Accordingly, this application has to do with means for feeding material through a feed opening in the vertical side of a baling chamber.

An object of the present invention is to provide improved feeding means for a baler.

Another object is the provision of improved feeding means for moving material through a feed opening in the vertical side of a baling chamber associated with a pick-up baler.

Still another object is to provide packer fingers which in their packing stroke move slowly and having finished such work stroke, then quickly withdraw from the material handled and return before initiating a new stroke in the cycle.

Other objects will appear from the disclosure.

According to the present invention, packer elements or fingers are pivotally mounted on a rotating crank structure and are associated with a pivoted tubular or sleeve guide by means of an elongated element sliding in the tubular or sleeve guide. The arrangement is such that the packer elements in their work stroke move slowly into the baling chamber and then when the packing stroke is finished move quickly out of the baling chamber and return to begin a new stroke in the cycle.

In the drawings:

Figure 1 is a side view of a pick-up baler employing the novel feeding means of the present invention;

Figure 2 is a longitudinal sectional view taken through a portion of the pick-up baler of Figure 1; and Figure 3 is a sectional view taken on the line 3—3 of Figure 2.

The reference character 10 designates a pick-up baler, the general arrangement of which is shown in the aforementioned copending application of Crumb et al. The pick-up baler 10 includes a side mounted pick-up device 11 and a longitudinal baling unit 12 comprising a baling chamber 13 and a reciprocating plunger 14. The baling chamber 13 is provided with a feed opening 15 in a vertical side thereof facing the pick-up device 11 and through which opening material to be baled is moved from a transverse platform 14$^a$ alongside the baling chamber 13. Connected to the baling plunger 14 is a connecting rod 16 driven by a crank 17 in turn driven through means, not shown, by a uniformly rotating power source such as a power take-off shaft 18 extending from a tractor, not shown. To the forward end of the baling chamber 13 is connected a hitch frame 19 carrying a clevis 20 adapted to be connected to the draw-bar of the tractor, not shown.

The novel feeding means of the present invention will now be described. The top of the baling chamber 13 has a sheet metal part 21 having a portion 22 extending outwardly and upwardly over the platform 14$^a$. The sheet metal member 21 is provided with two elongated flanged openings 23. Secured to the top of the sheet metal member 21 is an angle frame bar 24 to which is secured a channeled upright frame bar 25. The platform 14$^a$ has a vertical back wall 26. A channeled upright frame bar 27 is secured to the back wall 26. A longitudinally disposed guide 28 is pivotally mounted by its trunnion ends 29 in the upper ends of the upright frame bars 25 and 27 and has spaced crosswise disposed tubular portions 30. In each tubular portion 30 is slidably mounted an elongated rod 31 secured by a threaded end 32 to a sleeved bracket member 33. Each sleeved bracket member 33 is pivotally mounted on a pin portion 34 of a crank structure 35 having depending arm portions 36. The crank structure 35 is connected through a coupling 37 and a universal joint 38 with a shaft 39, in turn connected by means, not shown, with gearing, not shown, and operable from the tractor power take-off shaft 18.

Pivotally mounted on each bracket member 33 at 40 spaced from pin 34 is a packer element or finger 41. Each packer element 41 extends downwardly and is also connected to the members 33 by means of an upstanding eye bolt 42 pivotally connected to the packer element 41 at 43, a spring 44 mounted upon the eye-bolt 42, and a nut 45 holding the spring 44 on the bolt 42 under desired compression and against the member 33 and providing individual relief for each packer element 41. Each packer element 41 is preferably of channel shape, the base of the channel being indicated by the reference character 46 and each side of the channel by the reference character 47. A part 48 bridges the sides 47 of each packer element 41 at its upper end and is engaged by the lower end of a bolt 49 adjustably threaded in each bracket member 33 and secured thereto by a lock nut 50. Each packer element 41 is relatively rigid with respect to the member 33, although the spring 44 permits some yielding of the packer element with respect to the member. The bolt 49 acting against the part 48 serves as a limit to the movement of the packer element 41 with respect to the member 33 in a clockwise direction, as viewed in Figure 3. The adjustment of bolt 49 permits the packers 41 to assume different relations with respect to the side of the bale chamber 13, so that the density of the bale in formation can be controlled, regardless of the kind of material to be baled.

As appears in Figure 3, rotation of the crank structure 35 causes the packer elements 41 to move conjointly along the platform 14ª through the opening 15 into the baling chamber 13 and out through the sheet metal member 21 at the top of the baling chamber 13. Since each elongated rod 31 is secured to a member 33 and each member 33 to a packer element 41, movement of each packer element 41 is determined by the position of the rod 31 in the guide 30 and the angular position of the guide 30. In the full-line position of the packer element 41 illustrated in Figure 3, the position being designated by the reference character A, the packer element 41 is above the baling chamber 13, and the crank pin 34, which constitutes the effective pivot of the packer element 41 on the crank arm 36, is quite close to the pivot of the guide 28. Thus, for a certain small angle of movement of the crank 36 about the axis of rotation, there is a relatively large angle of movement of the rod 31 and the packer element 41 with respect to the crank 36, and so, as the crank structure 35 continues upright in the clockwise direction of Figure 3 from the position A, the packer element moves somewhat quickly to the right. When the dash-dot position B is reached, each packer element 41 has passed through the slots 23 in the extension 22 of the sheet metal member 21 constituting the top of the baling chamber 13 and has begun to move toward the left over the platform 14ª toward the baling chamber 13. In this position, the crank pin 34 is a relatively great distance from the pivot of the guide 28. Thus, during continued movement of the packer element 41 to the left from the position B through the feed opening 15 into the baling chamber 13 to a point near the dash-dot position C, there is little change in the angle of the packer element 41 with respect to the crank 36. When the position C is reached, the crank pin 34 is moving generally upwardly, and the packer element 41 is moving almost vertically, since a line 51 drawn between the tip of the packer 41 and the crank pin 34 is generally alined with a line 52 drawn between the crank pin 34 and the tubular portion 30 of the guide 28. As the packer element 41 moves from the position C to the position A, it is quickly drawn through the slot 23 in the sheet metal 21 forming the top of the baling chamber 13. It is desirable, of course, to have a quick withdrawal of the packer elements 41, since they must be withdrawn completely from the baling chamber 13 before the baling plunger 14 reaches its extreme forward position. The quick withdrawal of the packer elements 41 permits the packer elements to have a maximum amount of time between the packing positions B and C, and thus to move slowly enough for efficient feeding of the material to be baled through the opening 15 into the baling chamber 13. It should be noted that in the position B, the angle of the packer element is such that the tip thereof is considerably displaced outward of the crank pin 34 so that the maximum sweep over the platform 14ª is obtained.

It will be apparent from the foregoing description that a new control for the feeding means of a baler has been provided. Packer elements 41 move from a dotted-line position B in which the tips of the packer elements are to the right of the crank pin 34 to the position C in which the tips are to the left of the crank pin 34, so that a maximum distance is obtained for movement of the material from the platform into the baling chamber. Thereupon, almost vertical movement of the packing elements 41 out of the baling chamber 13 through the top thereof takes place, because of the slidable mounting of elongated rods 31 in the pivotally mounted guides 30. Because the movement of the packer elements 41 out of the baling chamber 13 is almost vertical, the tips of the packer elements may move the maximum distance into the baling chamber 13 toward the left side thereof, and an optimum packing action is had.

The control for the packing means has been illustrated as applied to a baling chamber having a feed opening in the vertical side thereof, and it is of special advantage with this type; but it is to be understood that it may also be applied to other baling chambers.

The invention is to limit the invention only within the scope of the appended claims.

What is claimed is:

1. In combination, a baling chamber having a feed opening in a vertical side, a baling plunger mounted for reciprocation in the baling chamber, a packer element adapted to move material through the said feed opening into the baling chamber, and means mounting the packer element for movement into and out of the baling chamber, said mounting means comprising a rotatable member rotatable about a certain axis, means pivotally connecting the packing member to a point of the rotatable member spaced from its axis of rotation, a guide pivotally mounted at a point spaced from the axis of rotation of the member a greater distance than the spacing between the axis of rotation and the pivot of the packer element on the rotatable member, and an elongated part associated with the packer element and slidably mounted in the guide for causing the packer element to have a relatively large angle of movement about its pivot on the rotatable member for a given angle of movement of the rotatable member when the pivot of the packer element is between the pivot of the guide and the axis of the rotation of the rotatble member and to have a relatively large angle of movement about its pivot on the rotatable member for the same given angle of movement of the rotatable member when the axis of rotation of the rotatable member is between the pivot of the guide and the pivot of the packer element on the rotatable member.

2. In combination, a baling chamber, a packer element adapted to move material into the baling chamber and means mounting the packer element for movement into and out of the baling chamber, said mounting means comprising a rotatable member rotatable about a certain axis, means pivotally connecting the packing member to a point of the rotatable member spaced from its axis of rotation, a guide pivotally mounted at a point spaced from the axis of rotation of the member a greater distance than the spacing between the axis of rotation and the pivot of the packer element on the rotatable member, and an elongated part associated wtih the packer element and slidably mounted in the guide for causing the packer element to have a relatively large angle of movement about its pivot on the rotatable member for a given angle of movement of the rotatable member when the pivot of the packer element is between the pivot of the guide and the axis of rotation of the rotatable member and to have a relatively large angle of movement about its pivot on the rotatable member for the same given angle of movement of the rotatable member when the axis of rotation of the rotatable member is between the pivot of the guide and the pivot of the packer element on the rotatable member.

3. In combination, a baling chamber having a feed opening in a vertical side, a baling plunger mounted for reciprocation in the baling chamber, a packer element adapted to move material through the feed opening into the baling chamber, and means mounting the packer element for movement into the baling chamber through the feed opening in the vertical side and out of the baling chamber through the top thereof, said mounting means comprising a rotatable member having an axis of rotation above the baling chamber, means pivotally mounting the packer element on the rotatable member at a point spaced from its axis of rotation, a guide pivotally mounted above the axis of rotation of the rotatable member a greater distance than the spacing between the axis of rotation and the pivot of the packer element on the rotatable member, an elongated part slidably mounted on the guide and associated with the packer element for causing it to have a relatively large angle of movement about its pivot on the rotatable member for a given angle of movement of the rotatable member when the pivot of the packer element is above the axis of rotation of the rotatable member and to have a relatively small angle of movement about its pivot on the rotatable member for the same given angle of movement of the rotatable member when the pivot of the packer element is below the axis of rotation of the rotatable member, whereby the packer element moves relatively slowly through the feed opening in the vertical side into the baling chamber and relatively quickly out through the top of the baling chamber.

4. A packer mechanism for feeding material over a transverse platform into a longitudinal bale chamber, said mechanism comprising a support, a sleeve guide rockably carried by the support, a crank-shaft disposed below the guide, a bracket mounted on the crank-shaft and through which the crank-shaft turns, a depending packer pivotally connected to the bracket at a point spaced from the crank-shaft, an adjustable abutment between the bracket and packer, a guide member connected to the bracket and slidably carried in the sleeve guide, and resilient means operatively associated with the bracket and connected to the packer.

5. A packer mechanism for feeding material over a transverse platform into a longitudinal bale chamber, said mechanism comprising a support, a sleeve guide rockably carried by the support, a crank-shaft disposed below the guide, a bracket mounted on the crank-shaft and through which the crank-shaft turns, a depending packer pivotally connected to the bracket at a point spaced from the crank-shaft, an adjustable abutment between the bracket and packer, a guide member connected to the bracket and slidably carried in the sleeve guide, and resilient means operatively associated wtih the bracket and connected to the packer, said packer being channel shaped with its bight serving as the working face and its sides as the pivot mounting on the bracket.

FREDERICK P. DICKOW.